US 9,298,903 B2

(12) United States Patent
Gupta et al.

(10) Patent No.: US 9,298,903 B2
(45) Date of Patent: Mar. 29, 2016

(54) PREVENTION OF PASSWORD LEAKAGE WITH SINGLE SIGN ON IN CONJUNCTION WITH COMMAND LINE INTERFACES

(71) Applicant: International Business Machines Corporation, Armonk, NY (US)

(72) Inventors: Gaurav Gupta, Kanpur (IN); Logeswaram T. Rajamanickam, Kunnathur (IN); Arun Ramakrishnan, Tamil Nadu (IN); Rohit Shetty, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/844,859

(22) Filed: Mar. 16, 2013

(65) Prior Publication Data

US 2014/0282966 A1   Sep. 18, 2014

(51) Int. Cl.

| G06F 7/04 | (2006.01) |
|---|---|
| G06F 21/33 | (2013.01) |
| G06F 21/41 | (2013.01) |
| H04L 29/06 | (2006.01) |
| G06F 21/55 | (2013.01) |

(52) U.S. Cl.
CPC ............ *G06F 21/33* (2013.01); *G06F 21/41* (2013.01); *G06F 21/556* (2013.01); *H04L 63/0815* (2013.01)

(58) Field of Classification Search
CPC ............ H04L 63/0818; H04L 63/0815; H04L 63/0807; H04L 63/0853; H04L 63/0823; G06F 21/33; G06F 21/556; G06F 2221/2115; G06F 21/34
See application file for complete search history.

(56) References Cited

U.S. PATENT DOCUMENTS

| 6,651,168 | B1 | 11/2003 | Kao et al. | |
|---|---|---|---|---|
| 6,826,696 | B1 | 11/2004 | Chawla et al. | |
| 7,016,875 | B1 | 3/2006 | Steele et al. | |
| 7,260,838 | B2 | 8/2007 | Bones et al. | |
| 8,522,335 | B2 * | 8/2013 | Lawrence et al. | 726/10 |
| 8,707,405 | B2 * | 4/2014 | O'Donnell et al. | 726/6 |
| 8,745,697 | B2 * | 6/2014 | Sakakibara | 726/4 |

(Continued)

OTHER PUBLICATIONS (IEEE Snapshot).*
"How to Pass ltpa token between applications?—Websphere," Tech Stack, <http://techstack.com/forum/websphere/30880-how-pass-ltpa-token-between-applications.html>, downloaded Mar. 16, 2013, May 3, 2004.

(Continued)

*Primary Examiner* — Ali Abyaneh
(74) *Attorney, Agent, or Firm* — Thomas E. Tyson; Gregory K. Goshorn; Greg Goshorn, P.C.

(57) ABSTRACT

Provided are techniques for transmitting a lightweight domain access protocol (LDAP) request from an user interface application (UIA) to a LDAP server, receiving, at the UIA, a LTPA token in response to the transmitting of the LDAP request; transmitting, from the UIA, to a command line interface associated with an application, the LTPA token in conjunction with a command to be executed by the application; verifying by the application the LTPA token; and in response to the verifying, executing, by the application the command. The techniques also include transmitting, from the application, to a second command line interface associated with a second application, the LTPA token in conjunction with a second command to be executed by the second application; verifying by the second application the LTPA token; and in response to the verifying by the second application, executing, by the second application the second command.

16 Claims, 5 Drawing Sheets

(56) References Cited

U.S. PATENT DOCUMENTS

| | | | |
|---|---|---|---|
| 2002/0188597 A1* | 12/2002 | Kern et al. | 707/1 |
| 2004/0199584 A1* | 10/2004 | Kirshenbaum et al. | 709/205 |
| 2006/0265231 A1* | 11/2006 | Fusaro et al. | 705/1 |
| 2007/0294388 A1* | 12/2007 | Yu | 709/224 |
| 2009/0013395 A1* | 1/2009 | Marcus et al. | 726/8 |
| 2009/0064107 A1* | 3/2009 | Chan et al. | 717/120 |
| 2011/0153351 A1* | 6/2011 | Vesper et al. | 705/2 |
| 2011/0154464 A1 | 6/2011 | Agarwal et al. | |
| 2011/0179466 A1* | 7/2011 | Hamada | 726/3 |
| 2012/0198543 A1* | 8/2012 | Rogers et al. | 726/17 |
| 2012/0210436 A1* | 8/2012 | Rouse | 726/26 |
| 2012/0265864 A1* | 10/2012 | Bourakov et al. | 709/221 |
| 2013/0144996 A1* | 6/2013 | Bourakov et al. | 709/221 |

OTHER PUBLICATIONS

Reading LTPA Cookie from Portlet & Servlet and passing the LTPA cookie into remote WebSphere Server Using REST call, Enterprose Portals/WCM and Web Technologies, <http://balamurugan-portlets.blogspot.in/2010/07/reading-ltpa-cookie-from-portlet.html>, downloaded Mar. 16, 2013, Jul. 6, 2010.

Wardell, "Accessing Secure Remote Web Applications Using a Portlet Service," <http://www.ibm.com/developerworks/websphere/library/techarticles/0501_wardell/0501_wardell.html>, downloaded Mar. 16, 2013, Feb. 26, 2005.

"LTPA and ContentAccess Service," <http://www.ibm.com/developerworks/forums/thread.jspa?threadID=7388>, downloaded Mar. 16, 2013, Jan. 21, 2003.

* cited by examiner

US 9,298,903 B2

PREVENTION OF PASSWORD LEAKAGE WITH SINGLE SIGN ON IN CONJUNCTION WITH COMMAND LINE INTERFACES

FIELD OF DISCLOSURE

The claimed subject matter relates generally to computer security and, more specifically, to providing a single, secure sign on to command line interfaces.

BACKGROUND OF THE INVENTION

Access to computing tools and command line interfaces may require entry of a user ID and password. In general, command line interfaces are employed for multiple activities, such as but not limited to starting servers, changing configurations and so on. Command line interfaces may also be employed to deal with security configurations such as turning security on or off.

Some tools accept security certificates that provide the necessary login authentication information. In addition, a user may access computing tools and command line interfaces via a program or application. Typically, such access may necessitate that a user provide any required user IDs, passwords and credentials for each access attempt. Many programs do not allow cascading credentials, which makes it either difficult or impossible to provide secure, single sign on (SSO) to many applications and command line interfaces. One potential way to address this issue is the maintenance, by each accessing application or program, of a credential vault that manages credentials for the users who have access to the programs and command line interfaces.

SUMMARY

Provided are techniques for a secure, single sign on (SSO) to command line interfaces. Command line interfaces and programs that require secure SSO offer an option that enables a user to pass a token, such as a Lightweight Third-Party Authentication (LTPA) or LPTA2 token, that may be used to authenticate a user. In this manner, previously available credential management schemes are not required.

Provided are techniques for transmitting a lightweight domain access protocol (LDAP) request from an user interface application (UIA) to a LDAP server receiving, at the UIA, a LTPA token in response to the transmitting of the LDAP request; transmitting, from the UIA, to a command line interface associated with an application, the LTPA token in conjunction with a command to be executed by the application; verifying by the application the LTPA token; and in response to the verifying, executing, by the application the command. The techniques also include transmitting, from the application, to a second command line interface associated with a second application, the LTPA token in conjunction with a second command to be executed by the second application; verifying by the second application the LTPA token; and in response to the verifying by the second application, executing, by the second application the second command.

This summary is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed description.

BRIEF DESCRIPTION OF THE DRAWINGS

A better understanding of the claimed subject matter can be obtained when the following detailed description of the disclosed embodiments is considered in conjunction with the following figures, in which:

DETAILED DESCRIPTION

Figure 1:
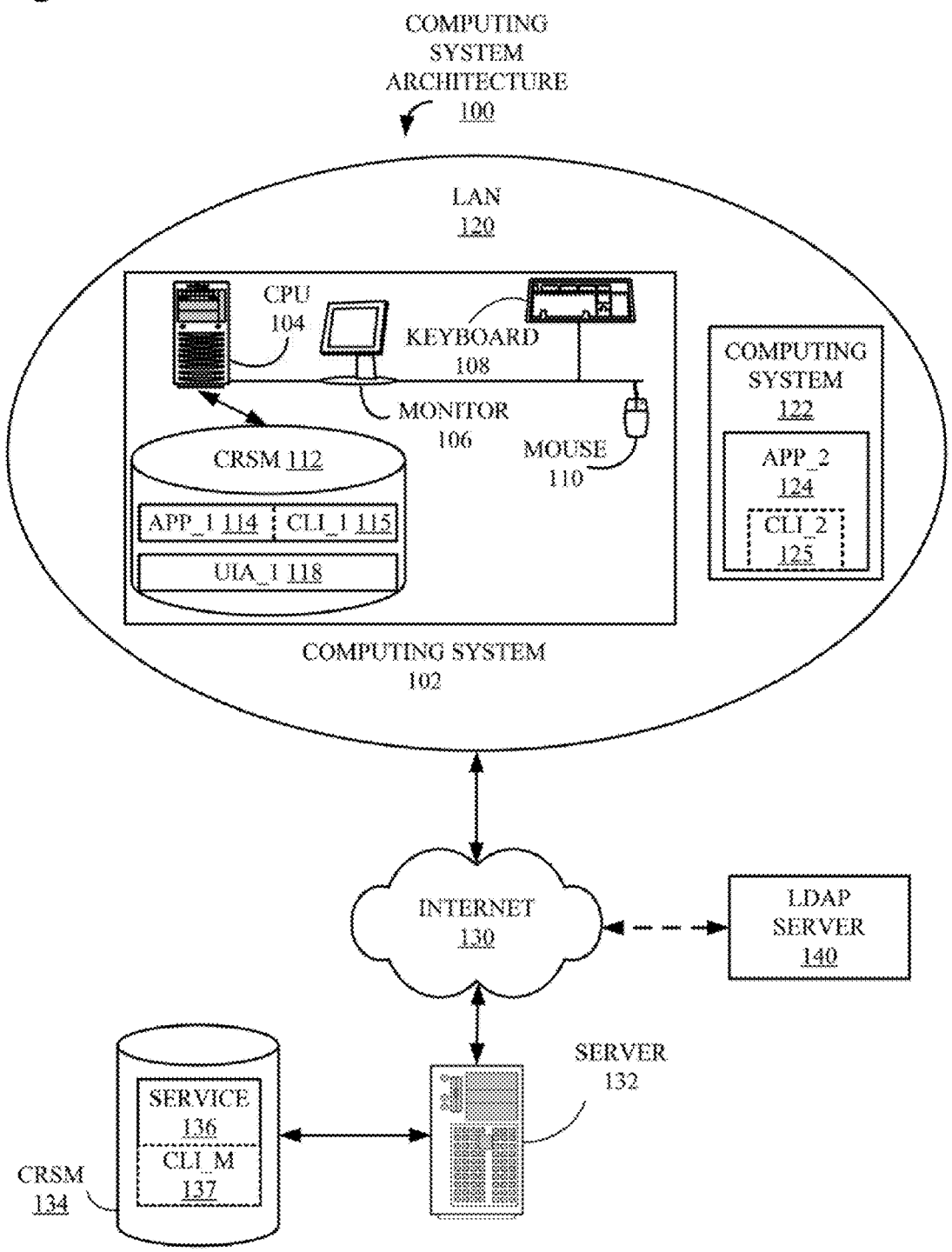
FIG. 1 is one example of a computing system architecture that may implement the claimed subject matter.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational actions to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Turning now to the figures, FIG. 1 is one example of a computing system architecture 100 that may implement a single sign on (SSO) procedure in accordance with the disclosed technology. A computing system 102 includes a central processing unit (CPU) 104, coupled to a monitor 106, a keyboard 108 and a pointing device, or "mouse," 110, which together facilitate human interaction with other elements of architecture 100 and computing system 102. Also included in computing system 102 and attached to CPU 104 is a computer-readable storage medium (CRSM) 112, which may either be incorporated into CPU 104 i.e. an internal device, or attached externally to CPU 104 by means of various, commonly available connection devices such as but not limited to, a universal serial bus (USB) port (not shown). CRSM 112 is illustrated storing an example of a computer application, i.e. app_1 114. Appl_1 114 is hosted by computing system 102 and includes a command line interface (CLI), i.e. CLI_1 115, that may be accessed by employing the claimed subject matter. Also stored on CRSM 112 is logic associated with a user interface (UI) application, or "UIA," 118. UIA 118. It should be noted that a typical computing system would include more than one application, but for the sake of simplicity only one is shown.

Computing system 102 is communicatively coupled to a local area network (LAN) 120, which is coupled to the Internet 130. Also coupled to LAN 120, and thereby computing system 102, is a second computing system 122. Although not shown, client system 122 would also typically include a CPU, monitor, keyboard, pointing device and CRSM. Computing system 122 is illustrated hosting a second application, i.e. app_2 124, which is stored on a CRSM (not shown) and executed on a CPU, or "processor," (not shown), both associated with computing system 122. Like app_1 114, app_2 124 includes a CLI, i.e., CLI_2 125, that may be accessed in accordance with the claimed subject matter.

Also attached to the Internet 130 are a server 132 and a lightweight directory access protocol (LDAP) server 140, which like computing systems 102 and 122 would typically include a CPU, monitor, keyboard and pointing device. Coupled to server 132 is a CRSM 134, which is illustrated as storing a service application, i.e. or simply "service," 136, which includes a CLI, i.e. a CLI_M 137, that may be accessed in accordance with the claimed subject matter. LDAP server 140 and its relation to the claimed subject matter are explained below in conjunction with FIGS. 2-5.

Although in this example, computing systems 102, 122, server 132 and LDAP server 140 are communicatively coupled via one or both of LAN 120 and the Internet 130, they could also be coupled through any number of communication mediums such as, but not limited to, additional LANs (not shown) or direct or indirect, wired or wireless connections. Further, it should be noted there are many possible computing system configurations, of which architecture 100 and computing system 102 are only simple examples. Throughout the Specification, computing systems 102 and 122, applications 114 and 124, server 132 and service 136 are employed as examples of computing components that may implement and/or utilize the claimed subject matter.

Figure 2:
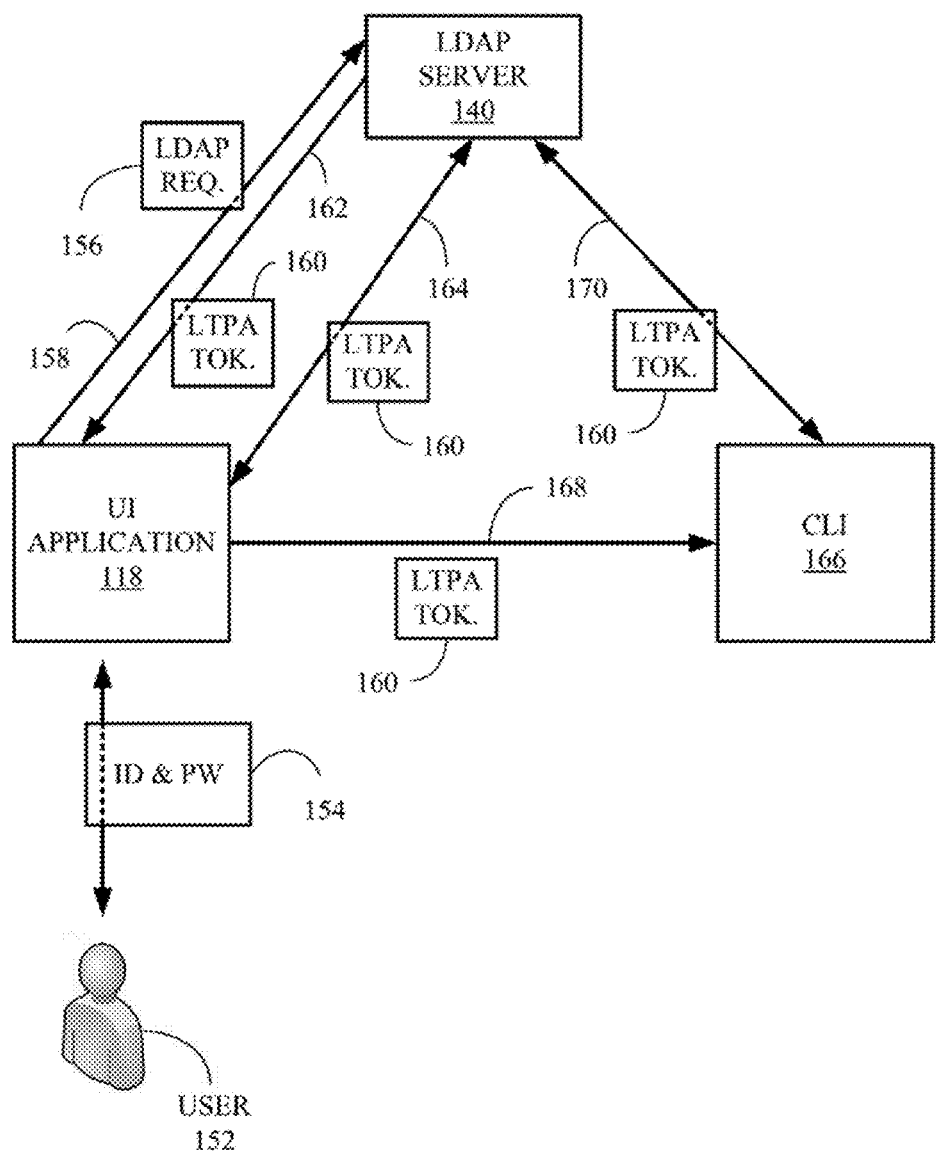
FIG. 2 is a block diagram illustrating relationships among a user, a user interface (UI) application, a lightweight domain access protocol (LDAP) server and a command line interface (CLI) in accordance with the claimed subject matter.

FIG. 2 is a block diagram illustrating relationships among a user 152, UIA 118 (FIG. 1). LDAP server 140 (FIG. 1) and a CLI 166 in accordance with the claimed subject matter. User 152 enters a user identification (ID) and password (PW) 154 into UIA 118 to log in and be authenticated with respect to UIA 118. UIA 118 transmits a LDAP Request (Req.) 156, which includes ID & PW 154, to LDAP server 140 via a communication link 158. In response to a verification and authentication of user 152 based upon ID and PW 154, LDAP server 140 responds to UIA 118 by transmitting to UIA 118 a Lightweight Third-Party Authentication (LTPA) token (tok.) 160 via a communication link 162. UIA 118 may then utilize LTPA token 160 to communication with LDAP server 140 without reentering ID and PW 154.

In accordance with the claimed subject matter, LTPA token 160 may be transmitted to a CLI 166 via a communication link 168 to provide a secure sign on to CLI 166. CLI 166 transmits LTPA token 160 to LDAP server 140 via a communication link 170 to verify and authenticate user 152. Currently available technology requires that user 152 transmit ID and PW 154 to CLI 166 and CLI 166 to transmit a LDAP req. (not shown) to LDAP server 140. Some disadvantages of the current technology include, but are not limited to, requiring that CLI 166 know ID and PW 154 typically by maintaining a credential vault and managing the credentials for users with access to CLI 166. In addition, there is the potential that ID and PW 154 might end up being recorded into a console log, which may be a security issue.

Figure 3:
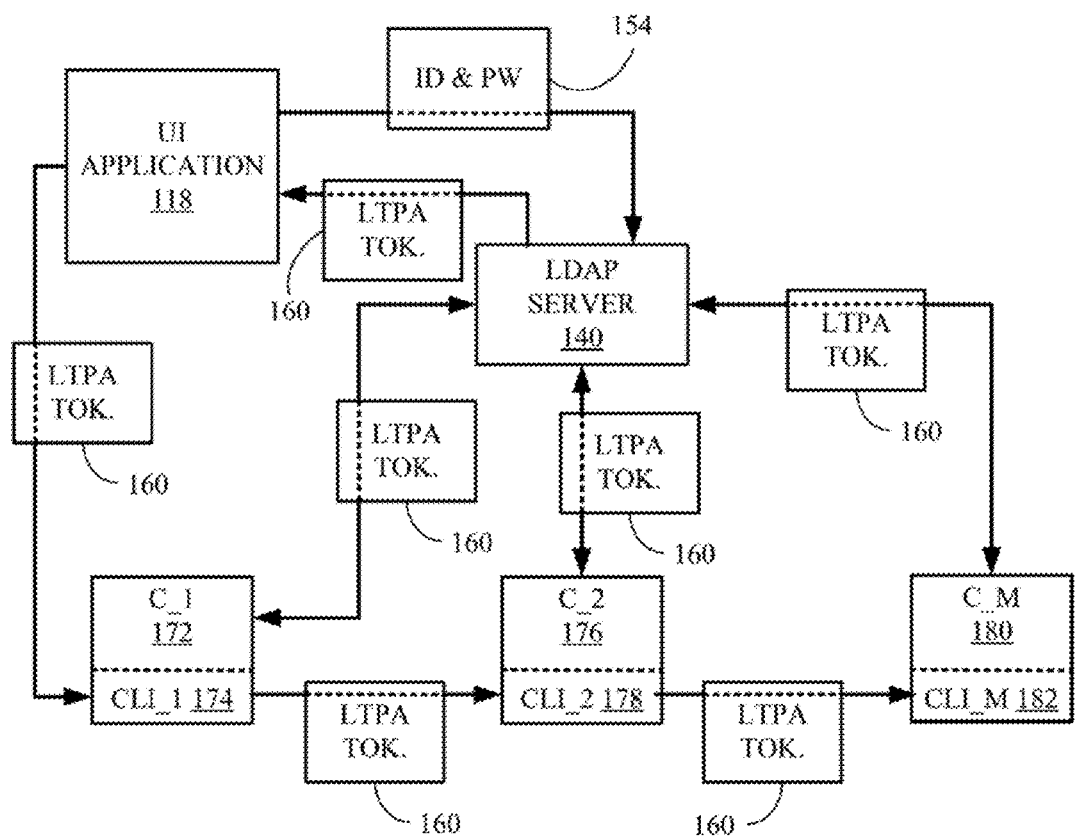
FIG. 3 is a block diagram illustrating relationships among a UI application, web components C1, C2 . . . $C_M$, and the LDAP server.

FIG. 3 is a block diagram illustrating relationships among a UIA 118 (FIGS. 1 and 2), some examples of web components, i.e., a C_1 172, a C_2 176 and so on to a C_M 180 and LDAP server 140 (FIGS. 1 and 2). Each of web components 172, 176 and 180 have a CLI, i.e., a CLI_1 174, a CLI_2 178 and a CLI_M 182, respectively. As in FIG. 2, UIA 118 transmits ID and PW 154, within LDAP Req. 156 (FIG. 2), to LDAP server 140. In response to a verification and authentication of user 152 (FIG. 2) based upon ID and PW 154, LDAP server 140 responds by transmitting to UIA 118 a LTPA token 160 (FIG. 2).

When UIA 118 accesses C_1 172, LTPA token 160 is transmitted to CLI_1 174. In other words, CLI_1 174 exposes an option that allows UIA 118 to pass LTPA token 160 rather than ID and PW 154. C_1 172 may then verify and authenticate user 152 by transmitting LTPA token 160 to LDAP server 140. In this manner, C_1 172 does not need to know ID and PW 154 and any chances that ID and PW 154 may be inadvertently exposed are mitigated by obscuring, using LTPA token 160, the username and password from a command execution history, the shell log or a process corresponding to C_1 172 on an operating system (OS).

In a similar fashion, C_1 172 may transmit LTPA token 160 to CLI_2 178 of C_2 so that C_1 172 and user 152 may be authenticated and verified without transmitting ID and PW 154. C_2 176 merely transmits LTPA token 160 to LDAP server 140 for authentication. This chain of verification/authentication may continue for, by way of example, having C_2 176 transmit LTPA token 160 to CLI_M 182 of C_M 180, which verifies and authenticates C_2 176 and user 154 by transmitting LTPA token 160 to LDAP server 140.

Figure 4:
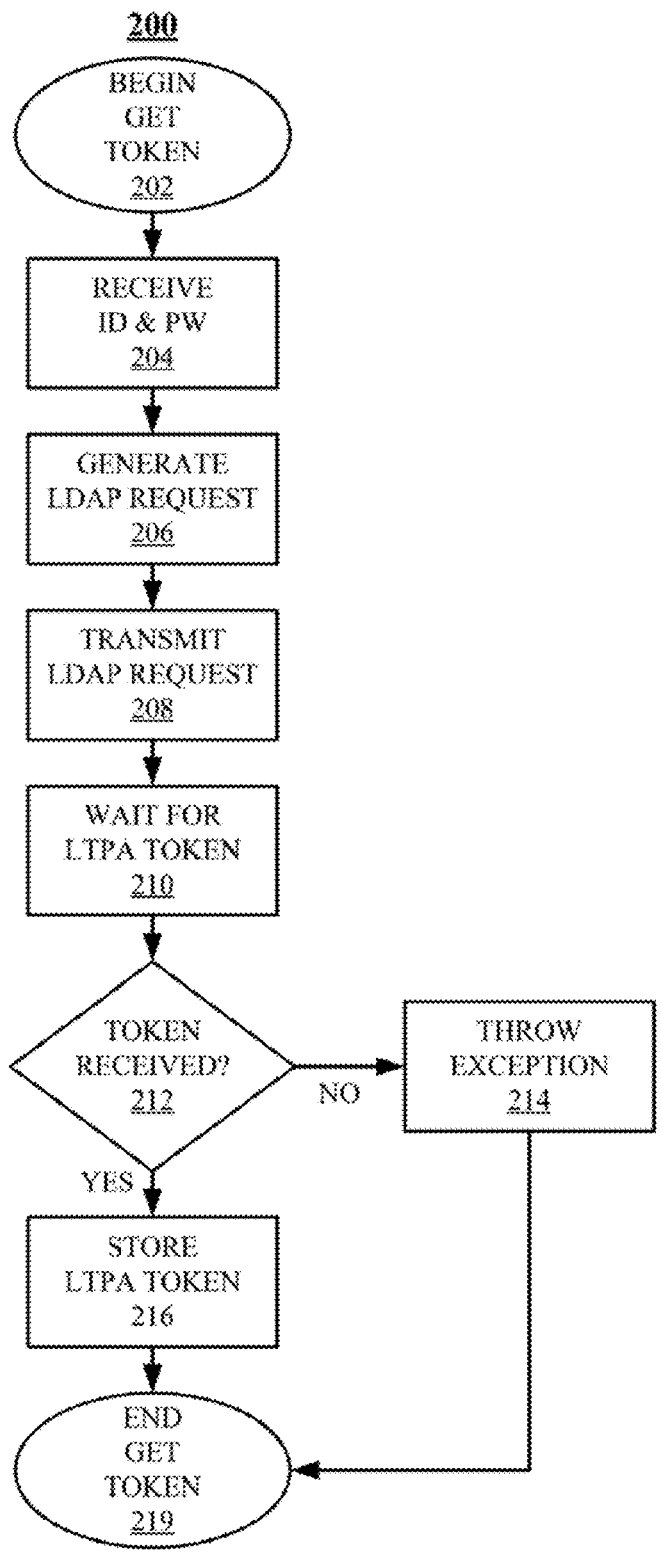
FIG. 4 is a flowchart of one example of a "Get Token" process that may implement aspects of the claimed subject matter.

FIG. 4 is a flowchart of one example of a "Get Token" process 200 that may implement aspects of the claimed subject matter. In the following example, process 200 is associated with logic stored on CRSM 112 (FIG. 1) and executed on one or more processors (not shown) of CPU 104 (FIG. 1) of computing system 102 (FIG. 1).

Process 200 starts in a "Begin Get Token" block 200 and proceeds immediately to a "Receive ID and PW" block 204. During processing associated with block 204, user 152 logs into UIA 118 (FIGS. 2 and 3) by providing a user ID and password, i.e. ID & PW 154 (FIGS. 2 and 3). During processing associated with a "Generate LDAP Request" block 206, LDAP Req. 156 (FIG. 2) is generated. During processing associated with a "Transmit LDAP Request" block 208, LDAP Req. 156 is transmitted from UIA 118 to LDAP server 140 (FIGS. 1-3). Although not shown in FIG. 4, upon receipt of LDAP Req. 156, which includes ID & PW 154, LDAP server 140 authenticates and verifies user 152, generates LTPA token 160 (FIGS. 2 and 3) and transmits the token back to UIA 118. During processing associated with a "Wait for LTPA token" block 210, UIA 118 waits for LDAP server 140 to transmit LTPA token 160 back.

During processing associated with a "Token Received?" block 212, a determination is made as to whether or not token 160 has been returned. It should be understood that reasons a token may not be returned include, but are not limited to, LDAP server 140 rejecting ID & PW 154 and thereby not authenticating and/or verifying user 152 or process 200 may issue a timeout after waiting longer than a predetermined period of time. In the event that a LTPA token is not received, control proceeds to a "Throw Exception" block 214 during which appropriate actions are taken, including but not limited to, notify user 152 and retrying the login by retransmitting LDAP Req. 156.

If, during processing associated with block 212, a determination is made that LTPA token 160 has been received, control proceeds to a "Store LTPA" block 216. During processing associated with block 216, LTPA token 160 received during processing associated with block 210 is stored in CRSM 112 for subsequent use in accordance with the claimed subject matter. Once LTPA token 160 has been stored during processing associated with block 216 or an exception has been thrown during processing associated with block 214, control proceeds to an "End Get Token" block 219 in which process 200 is complete.

Figure 5:
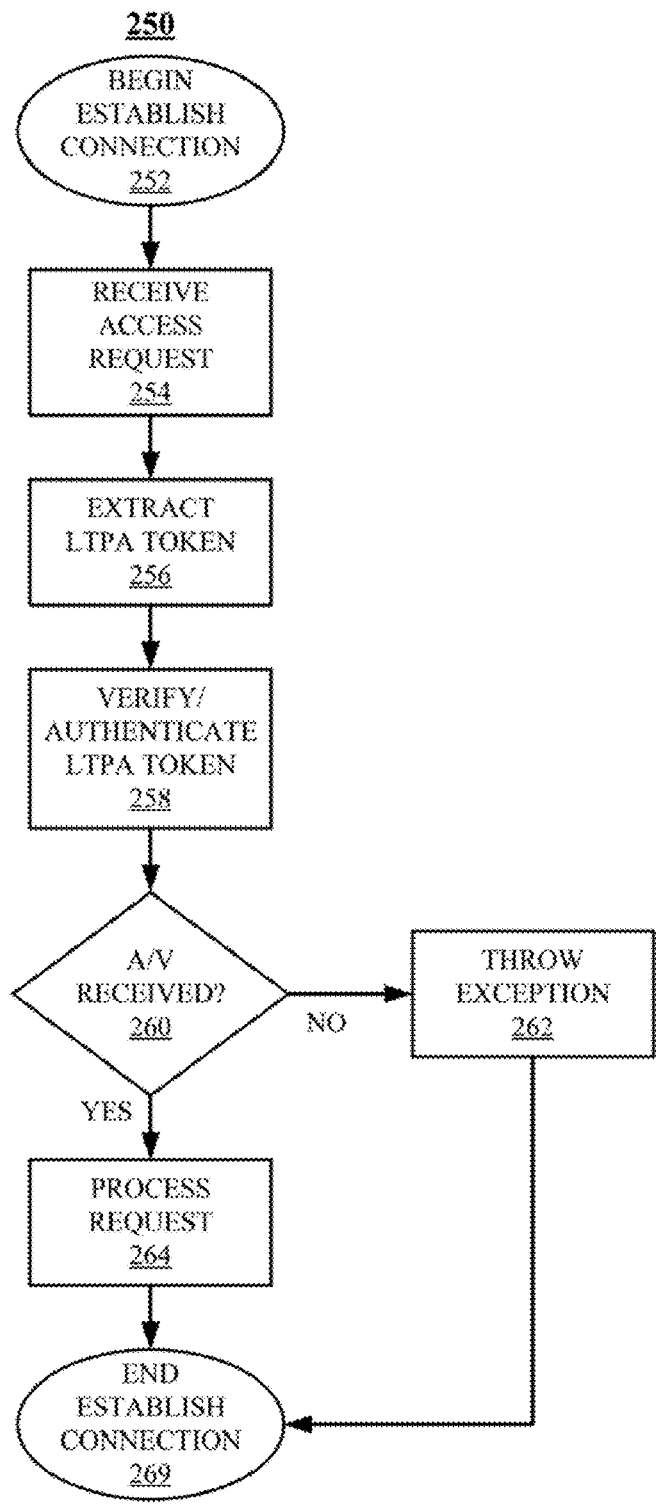
FIG. 5 is a flowchart of one example of an "Establish Connection" process that may implement aspects of the claimed subject matter.

FIG. 5 is a flowchart of one example of an "Establish Connection" process 250 that may implement aspects of the claimed subject matter. In the following example, process 250 is associated with logic stored on a CRSM (not shown) associated with computing system 122 (FIG. 1) and executed on one or more processors (not shown) of a CPU (not shown) of computing system 122. In this example UIA 118 (FIGS. 2 and 3) is requesting access to CLI_2 125 of App_2 124 (FIG. 1) by sending, in accordance with the claimed subject matter. LTPA token 160, which has been stored on CRSM 112 (FIG. 1) of computing system 102 (FIG. 1) (see 216, FIG. 4).

Process 250 starts in a "Begin Establish Connection" block 302 and proceeds immediately to a "Receive Access Request" block 254. During processing associated with block 254, a CLI receives a request for access or services. Transmitted in conjunction with the request is LTPA token. In this example, UIA 118 (FIGS. 1-3) is transmitting a request to CLI_1 174 (FIG. 3) for access to the web component C_1 172 (FIG. 3) by means of message that includes LTPA token 160. It should be noted that the claimed subject matter is equally applicable to a request to a web component to a different web component. For example, once C_1 172 has received the request, an extracted LPTA token (see 256) and request for service may be forwarded to a different web component such as C_2 176 (FIG. 3) and CLI_2 178 (FIG. 3) or C_M 180 (FIG. 3) and CLI_M 182 (FIG. 3).

During processing associated with an "Extract LPTA Token" block 256, LPTA token 160 is extracted for the request received during processing associated with block 254. During processing associated with a "Authentication/verification (A/V) LPTA Token" block 258, the token extracted during processing associated with block 256 is verified by requesting authentication/verification from LPTA server 140 (FIGS. 1-3). During processing associated with an "A/V Received?" block 260, a determination is made as to whether or not LPTA server 140 has replied with an A/V message. It should be noted that reasons verification/authentication may not be returned include, but are not limited to, LDAP server 140 rejecting token 160 or process 250 may issue a timeout after waiting longer than a predetermined period of time.

If A/V is not received, control proceeds to a "Throw Exception" block 262. During processing associated with block 262, appropriate actions are taken, including but not limited to, notify the components in the chain of requests an ultimately user 152 (FIG. 2) and retrying the A/V by retransmitting LTPA token 160 to LPDA server 140. If, during processing associated with block 260, a determination is made that A/V has been received, control proceeds to a "Process Request" block 264 during which the requested operation is processed. In this manner, an operation may be requested from a component without transmitting a user ID and password. Finally, during processing associated with an "End Establish Connection" 269, process 250 is complete. In this manner, unnecessary exposure of user IDs and passwords is prevented.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

We claim:

1. A method, comprising:
   transmitting a lightweight domain access protocol (LDAP) request from an user interface application (UIA) to a LDAP server;
   receiving, at the UIA, a Lightweight Third-Party Authentication (LTPA) token in response to the transmitting of the LDAP request;
   exposing, by command line interface associated with an application, an option that allows the UIA to transmit the LTPA token rather than a username and password,
   transmitting, from the UIA, to the command line interface, the LTPA token in conjunction with a command to be executed by the application;
   verifying, without the username and password, by the application the LTPA token; and
   in response to the verifying, executing, by the application the command;
   wherein the username and password are obscured in any of an execution history, shell log and a process in an operating system, each corresponding to the application.

2. The method of claim 1, further comprising:
   transmitting, from the application, to a second command line interface associated with a second application, the LTPA token in conjunction with a second command to be executed by the second application;
   verifying by the second application the LTPA token; and
   in response to the verifying by the second application, executing, by the second application the second command.

3. The method of claim 1, wherein, in response to the verifying, the application does not require a username and password to execute the command.

4. The method of claim 1, wherein credential management is not required between the UIA and the application for the command to be executed.

5. An apparatus, comprising:
   a processor;
   a non-transitive, computer-readable storage medium (CRSM) coupled to the processor; and
   logic, stored on the CRSM and executed on the processor, for:
   transmitting a lightweight domain access protocol (LDAP) request from an user interface application (UIA) to a LDAP server;
   receiving, at the UIA, a Lightweight Third-Party Authentication (LTPA) token in response to the transmitting of the LDAP request;
   exposing, by a command line interface associated with an application, an option that allows the UIA to transmit the LTPA token rather than a username and password,
   transmitting, from the UIA, to the command line interface, the LTPA token in conjunction with a command to be executed by the application;
   verifying, without the username and password, by the application the LTPA token; and
   in response to the verifying, executing, by the application the command;
   wherein the username and password are obscured in any of an execution history, shell log and a process in an operating system, each corresponding to the application.

6. The apparatus of claim 5, the logic further comprising logic for:
   transmitting, from the application, to a second command line interface associated with a second application, the LTPA token in conjunction with a second command to be executed by the second application;
   verifying by the second application the LTPA token; and
   in response to the verifying by the second application, executing, by the second application the second command.

7. The apparatus of claim 5, wherein, in response to the verifying, the application does not require a username and password to execute the command.

8. The apparatus of claim 5, wherein credential management is not required between the UIA and the application for the command to be executed.

9. A computer programming product, comprising:
   a non-transitive, computer-readable storage medium (CRSM); and logic, stored on the CRSM and executed on the processor, for:
- transmitting a lightweight domain access protocol (LDAP) request from an user interface application (UIA) to a LDAP server;
- receiving, at the UIA, a Lightweight Third-Party Authentication (LTPA) token in response to the transmitting of the LDAP request;
- exposing, by a command line interface associated with an application, an option that allows the UIA to transmit the LTPA token rather than a username and password,
- transmitting, from the UIA, to the command line interface, the LTPA token in conjunction with a command to be executed by the application;
- verifying, without the username and password, by the application the LTPA token; and
- in response to the verifying, executing, by the application the command;
- wherein the username and password are obscured in any of an execution history, shell log and a process in an operating system, each corresponding to the application.

10. The computer programming product of claim 9, the logic further comprising logic for:
- transmitting, from the application, to a second command line interface associated with a second application, the LTPA token in conjunction with a second command to be executed by the second application;
- verifying by the second application the LTPA token; and
- in response to the verifying by the second application, executing, by the second application the second command.

11. The computer programming product of claim 9, wherein, in response to the verifying, the application does not require a username and password to execute the command.

12. The computer programming product of claim 9, wherein credential management is not required between the UIA and the application for the command to be executed.

13. A computer programming product for providing a command line interface, comprising a non-transitive computer-readable storage medium having program code embodied therewith, the program code executable by plurality of processors to perform a method comprising:
- receiving a Lightweight Third-Party Authentication (LTPA) token and a command from a user interface application (UIA);
- exposing, by the command line interface associated with an application, an option that allows the UIA to transmit the LTPA token rather than a username and password,
- transmitting the LTPA token, without the username and password, to a lightweight domain access protocol (LDAP) server;
- receiving, at the application from the LDAP sever, verification of authenticity with respect to the LTPA token; and
- in response to the receiving, executing the command;
- wherein the username and password are obscured in any of an execution history, shell log and a process in an operating system, each corresponding to the application.

14. The computer application of claim 13, the logic further comprising logic for:
- transmitting, from the application, to a second command line interface associated with a second application, the LTPA token in conjunction with a second command to be executed by the second application; and
- in response to the verifying by the second application, receiving a result corresponding to the second command from the second application.

15. The computer application of claim 13, wherein, in response to the verifying, the application does not require a username and password to execute the command.

16. The command line interface of claim 13, wherein credential management is not required by the application for the command to be executed.

* * * * *